(12) United States Patent
Roitshtein

(10) Patent No.: US 9,172,659 B1
(45) Date of Patent: Oct. 27, 2015

(54) NETWORK TRAFFIC ROUTING IN A MODULAR SWITCHING DEVICE

(75) Inventor: Amir Roitshtein, Holon (IL)

(73) Assignee: Marvell Israel (M.I.S.L.) Ltd., Yokneam (IL)

(*) Notice: Subject to any disclaimer, the term of this patent is extended or adjusted under 35 U.S.C. 154(b) by 407 days.

(21) Appl. No.: 13/542,806

(22) Filed: Jul. 6, 2012

Related U.S. Application Data

(60) Provisional application No. 61/507,011, filed on Jul. 12, 2011.

(51) Int. Cl.
*H04L 12/933* (2013.01)

(52) U.S. Cl.
CPC .............. *H04L 49/106* (2013.01); *H04L 49/10* (2013.01)

(58) Field of Classification Search
CPC ...... H04L 49/10; H04L 49/101; H04L 49/106
See application file for complete search history.

(56) References Cited

U.S. PATENT DOCUMENTS

| | | | |
|---|---|---|---|
| 5,896,380 A | 4/1999 | Brown et al. | |
| 6,426,947 B1 | 7/2002 | Banker et al. | |
| 6,535,530 B1 | 3/2003 | Matsui | |
| 6,807,179 B1 | 10/2004 | Kanuri et al. | |
| 7,111,162 B1 | 9/2006 | Bagepalli et al. | |
| 7,424,019 B1 | 9/2008 | Kopelman et al. | |
| 7,443,790 B2 | 10/2008 | Aicklen et al. | |
| 8,090,913 B2 | 1/2012 | Pelley, III et al. | |
| 8,130,754 B2 | 3/2012 | Binkert et al. | |
| 8,553,582 B1* | 10/2013 | Mizrahi et al. | 370/254 |
| 2002/0087716 A1 | 7/2002 | Mustafa | |
| 2003/0081599 A1 | 5/2003 | Wu et al. | |
| 2004/0015582 A1 | 1/2004 | Pruthi | |
| 2005/0083936 A1 | 4/2005 | Ma | |
| 2005/0204252 A1* | 9/2005 | Aramaki et al. | 714/748 |
| 2006/0147208 A1 | 7/2006 | Aicklen et al. | |
| 2006/0245423 A1 | 11/2006 | Best et al. | |
| 2007/0168531 A1 | 7/2007 | Sitaraman et al. | |
| 2007/0291778 A1* | 12/2007 | Huang et al. | 370/410 |
| 2008/0037531 A1 | 2/2008 | Donoghue et al. | |
| 2008/0159309 A1 | 7/2008 | Sultan et al. | |
| 2008/0162774 A1* | 7/2008 | Lyles et al. | 710/317 |
| 2008/0225853 A1 | 9/2008 | Melman et al. | |
| 2008/0315985 A1 | 12/2008 | Johnsen et al. | |

(Continued)

OTHER PUBLICATIONS

Jaramillo et al., "Padded Frames: A Novel Algorithm for Stable Scheduling in Load-Balanced Switches," 40th Annual Conf. on Information Sciences and Systems (CISS 2006), *Institute of Electrical and Electronics Engineers*, pp. 1732-1737 (Mar. 2006).

*Primary Examiner* — Ajay Cattungal

(57) ABSTRACT

Data packets are received at a source packet processor that is disposed in a modular switching device having a plurality of packet processors and a plurality of crossbar processors coupled to the plurality of packet processors. Each of at least some of the received data packets is divided into a plurality of data packet fragments. The data packet fragments are transmitted to the crossbar processors to distribute the data packet fragments among the crossbar processors. The data packet fragments are stored at respective crossbar processors. An instruction to retransmit first stored packet fragments corresponding to a first data packet that had been received at the source packet processor is selectively transmitted from the source packet processor to the crossbar processors. Based on the instruction received from the source packet processor, the first stored packet fragments is retransmitted to a target packet processor among the plurality of packet processors.

16 Claims, 7 Drawing Sheets

(56) References Cited

U.S. PATENT DOCUMENTS

| | | |
|---|---|---|
| 2009/0003204 A1 | 1/2009 | Okholm et al. |
| 2009/0067431 A1* | 3/2009 | Huang et al. ............ 370/394 |
| 2009/0196303 A1 | 8/2009 | Battle et al. |
| 2009/0259825 A1 | 10/2009 | Pelley, III et al. |
| 2010/0035541 A1* | 2/2010 | Kim et al. ............ 455/9 |
| 2010/0046537 A1 | 2/2010 | Perlmutter et al. |
| 2010/0142398 A1 | 6/2010 | Arad et al. |
| 2011/0026541 A1 | 2/2011 | Beshai |
| 2011/0093660 A1 | 4/2011 | Pelley, III et al. |
| 2011/0164616 A1 | 7/2011 | Kloth et al. |
| 2012/0042121 A1 | 2/2012 | Kim et al. |

* cited by examiner

NETWORK TRAFFIC ROUTING IN A MODULAR SWITCHING DEVICE

CROSS-REFERENCE TO RELATED APPLICATION

This application claims the benefit of U.S. Provisional Patent Application No. 61/507,011, entitled "Distributed Enqueue Technology" which was filed on Jul. 12, 2011, the entire disclosure of which is hereby incorporated by reference herein.

FIELD OF THE DISCLOSURE

The present disclosure relates generally to communication networks and, more particularly, to switching devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some networking applications require switching between a high number of ports. For example, a typical data center includes a large number of servers, and switches to communicatively couple the servers to outside network connections, such as backbone network links. As another example, a high-volume website server system can include a large number of web servers, and switches to communicatively couple the web servers to backbone network links.

In some switching applications, to increase system bandwidth, multiple hardware components are used to process network traffic in parallel in a single modular switching system. In such applications, it is important to direct traffic through the various components of the switch in an efficient manner.

SUMMARY

In an embodiment, a method for routing network traffic includes receiving data packets at a source packet processor that is disposed in a modular switching device having a plurality of packet processors and a plurality of crossbar processors coupled to the plurality of packet processors. The method also includes dividing, at the source packet processor, each of at least some of the received data packets into a plurality of data packet fragments. The method additionally includes transmitting the data packet fragments to the crossbar processors to distribute the packet fragments among the crossbar processors, and storing distributed data packet fragments at respective crossbar processors. The method further includes selectively transmitting from the source packet processor to the crossbar processors an instruction to retransmit first stored packet fragments corresponding to a first data packet that had been received at the source packet processor. The method further still includes retransmitting, based on the instruction received from the source packet processor, the first stored packet fragments to a target packet processor among the plurality of packet processors.

In another embodiment, a modular switch device comprises a plurality of ingress packet processors configured to receive data packets from a network, divide selected data packets into data packet fragments, transmit the data packet fragments for additional processing in the modular switch device, and selectively generate and transmit control instructions governing an additional processing operation to be performed on the data packet fragments. The modular switch device also comprises a plurality of crossbar processors coupled to the plurality of ingress packet processors, the crossbar processors configured to receive data packet fragments from the plurality of packet processors, store the received data packet fragments in respective memories of the crossbar processors, receive from a first ingress packet processor a first control instruction governing the additional processing operation to be performed on one or more stored data packet fragments and in response to the first control instruction retransmit one or more stored data packet fragments. The modular switch device additionally comprises a plurality of egress packet processors coupled to the plurality of crossbar processors, the egress processors configured to receive the one or more data packet fragments that are retransmitted from the plurality of crossbar processors, reassemble the data packets from the retransmitted one or more data packet fragments; and perform a packet processing operation to egress the reassembled data packets.

DETAILED DESCRIPTION

Example switching methods and apparatus are described herein in the context of Ethernet networks. One of ordinary skill in the art will recognize, in light of the disclosure and teachings herein, that similar methods and apparatus are suitable for use in other communication networks as well.

Figure 1:
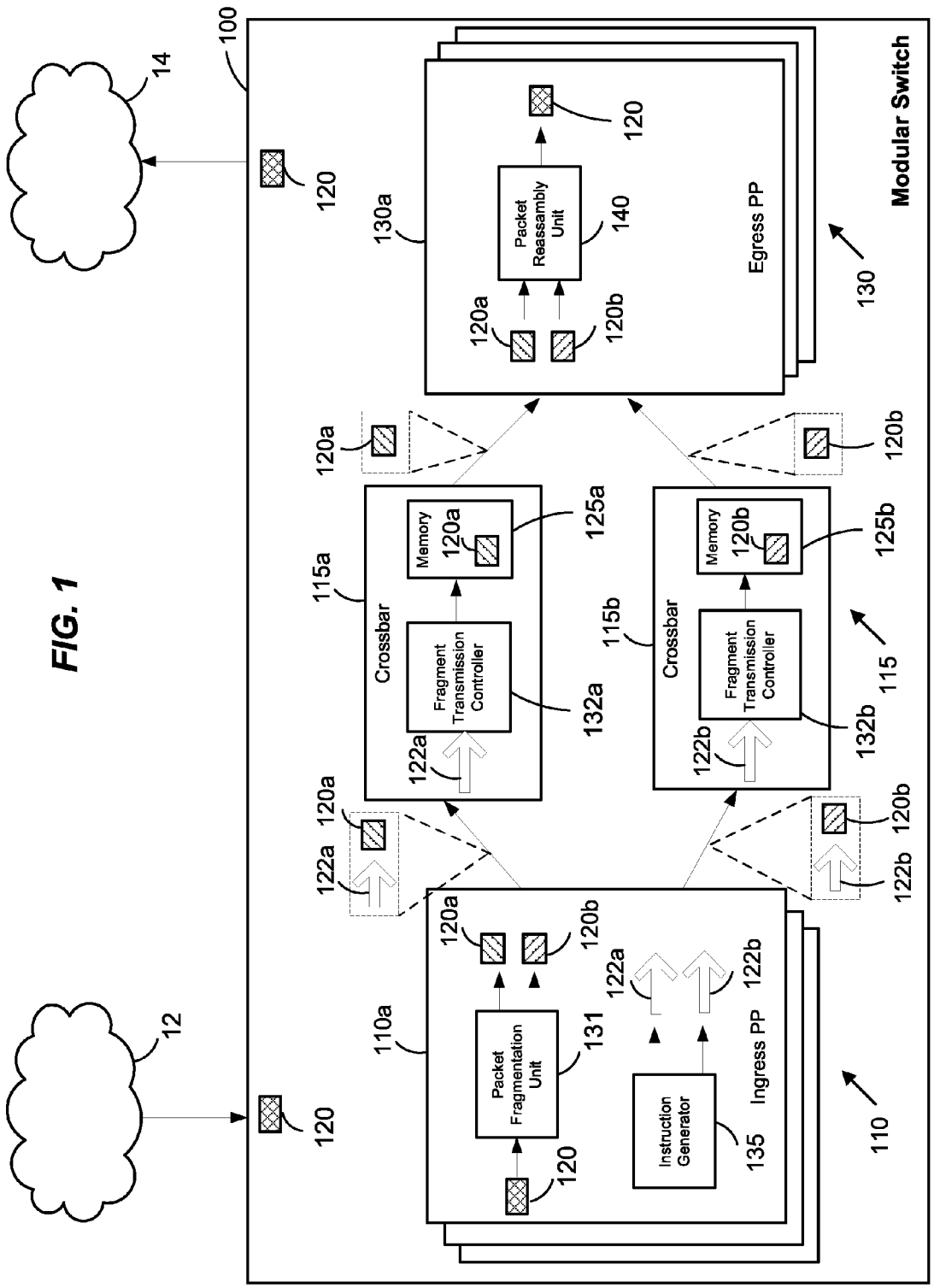
FIG. 1 is a block diagram of an example modular switch implementing network traffic directing techniques in accordance with an embodiment of the present disclosure.

FIG. 1 is a block diagram of an example modular switch 100, capable of efficiently and reliably directing traffic from ingress packet processors 110 to egress packet processors 131 via a plurality of crossbar processors 115. In the example illustrated in FIG. 1, the modular switch 100 directs network traffic between an external network 12 and an internal network 14. In an embodiment, the external network 12 is a wide area network (WAN) such as the Internet, and the internal network 14 is a local area network (LAN) such as one serving a particular corporation, a university, or any other organization. Additionally or alternatively, the modular switch 100 functions as a bridge and/or router between two or several wide area networks and/or local area networks, according to some embodiments. For ease of explanation, in the illustrated embodiment, ingress packet processors 110 receive or ingress data packets from the network 12 and egress packet processors 130 transmit or egress data packets to the network 14. In some embodiments, however, packet processors 110 and packet processors 130 include both ingress and egress capabilities. In such embodiments, packet processors 130 are also capable of receiving data packets from the network 14 and forwarding the received data packets to the packet processors 110, which, in turn, are capable of transmitting the data packets to the network 12. Although, for reasons of simplicity, only three ingress packet processors 110, two crossbar processors 115, and three egress packet processors are illustrated in FIG. 1, other suitable numbers of these devices are utilized in other embodiments.

Generally speaking, ingress (or source) packet processors 110 receive data packets from the network 12 and direct the received data packets to one or more egress (or target) packet processors 130 via one or more crossbar processors 115. In order to direct traffic through the modular switch 100 more efficiently (to reduce latency through the modular switch 100 or to load balance among the packet processors 110, for example), an ingress packet processor 110, in at least some situations, transmits received data packets to the target devices in several data packet fragments that are transmitted in parallel via several crossbar processors 115. In such embodiments, a source packet processor 110 receives a data packet, divides the data packet into one or more fragments, and transmits the fragments to one or more appropriate target packet processors 130 via the crossbar processor 115 by spraying different fragments to different ones of the crossbar processors 115. The crossbar processors 115 then forward the data packet fragments to the appropriate target packet processors 130, which reassemble the data packets from the data packet fragments and transmit the reassembled data packets to the network 14. However, if a cross bar processor 115 simply retransmits a data packet fragment upon received the data packet fragment, the data packet fragments may arrive to the target device out of order (e.g., mixed with fragments of other data packets transmitted by other source packet processors 110). In such cases, data packet fragments arriving at a target packet processor 130 must be reordered before the data packets can be properly reassembled at the target device.

Accordingly, in an embodiment, to further increase routing efficiency, the crossbar processors 115 delay fragment transmission by storing the fragments of a packet in a memory, and then transmitting the stored fragments in response to an instruction that the crossbar processors 115 receive from the source packet processor 110 that transmitted the fragments. In an embodiment, such instructions ensure that a suitable subset of packet fragments has been received by each crossbar processor 115 prior to transmission of the fragments from the crossbar processors 115. As discussed in more detail below, through the transmission of such instructions from the source devices 110 and through use of enqueue techniques implemented by the crossbar processors 115, the modular switch 100 is able to synchronize retransmission of data packet fragments from the crossbar processors 115 and to ensure that all fragments of a single data packet arrive to a target packet processor in order (e.g., not mixed with fragments of other data packets). As a result, the target packet processor 130 is able to quickly and efficiently reassemble the data packets and egress the reassembled data packets to the network 14. Further, because reordering packet fragments at a target packet processor prior to reassembling a data packet is typically a time and resource (e.g., memory, power, etc.) consuming process, delaying fragment transmission at the crossbar processors 115 to eliminate the need to reorder a data packet fragments prior to reassembly of the data packet generally improves resource utilization and reduces resource requirements in the modular switch 100, in at least some embodiments.

To better illustrate the handling of packets by the example modular switch 100, FIG. 1 depicts a data packet 120 a various stages as the data packet 120 travels through the modular switch 100. As illustrated, the data packet 120 enters the modular switch 100 from the network 12 and is handled by the ingress packet processor 110a. A packet fragmentation unit 131 of the packet processor 110a divides the data packet 120 into data packet fragments 120a and 120b. The data packet fragments 120a and 120b are transmitted, respectively, to the crossbar processor 115a and the crossbar processor 115b. Crossbar processor 115a and 115b receive the data packet fragments 120a and 120b and store the data packet fragments 120a and 120b in respective memories 125a and 125b. Subsequently, the instruction generator unit 135 of the ingress packet processor 110a generates and transmits instructions 122a and 122b to the respective crossbar processors 115a and 115b. Fragment transmission controllers 132a and 132b of the crossbar processors 115a and 115b, respectively, receive the instructions 122a and 122b, respectively, and, in response to receiving the instructions 122a and 122b, control the respective crossbar processors 115a and 115b to release the stored data packet fragments 120a and 120b from respective memories 125a and 125b and to transmit the data packet fragments 120a and 120b to a target packet processor 130a. Because the fragments 120a and 120b were transmitted from the respective crossbar processors 115 in response to the instructions 122a and 122b, respectively, the fragments 120a and 120b arrive to the target packet processor 130a in order (e.g., without any data packet fragments of other data packets transmitted by the input packet processors 110 to the crossbar processors 115 in between the data packet fragments 120a and 120b). A packet reassembly unit 140 of the egress packet processor 130a then reassembles the data packet 120 from the fragments 120a and 120b and egresses the reassembled data packet 120 to the network 14.

In at least some embodiments, because the data packet fragments received by the output packet processors 130 do not need to be reordered prior to reassembly, memory required for reassembly at the output packet processors 130 is significantly reduced compared to a switching system in which fragment order is not preserved as fragments that are sprayed through crossbar processors travel through the switching system, particularly in systems with a large number of connecting devices (e.g., crossbar processors). Moreover, as explained in more detail below, reassembly buffer size needed for packet reassembly in a modular switching device such as the modular switch 100 is related to the packet size and does not increase significantly with an increase of the number of crossbar processors (as explained in more detail blow in connection with Equation 3), making such modular switching devices easily scalable to larger system bandwidths, at least in some embodiments. Further, reassembling data packets from data packet fragments without having to reorder the fragments reduces latency introduced to the network traffic flow through the modular switch 100, at least in some embodiments. In general, latency introduced by a switching device such as the modular switch 100 decreases as the number of crossbar processors in the switching device increases.

As discussed above, packet processors 110 and packet processors 130 include both ingress and egress capabilities in some embodiments. Thus, in some embodiments, each packet processor 110 includes a packet reassembly unit 140 and each packet processor 130 includes a packet fragmentation unit 131 and an instruction generator unit 135.

Figure 2:
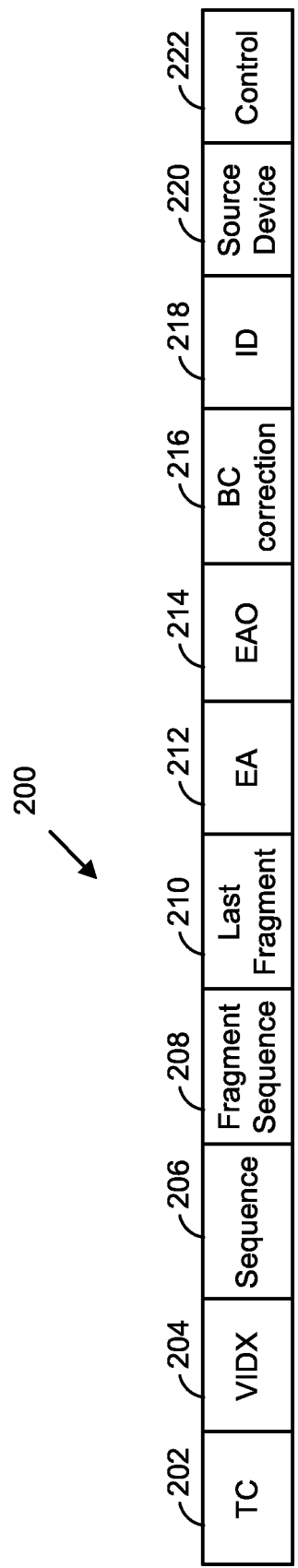
FIG. 2 is an example header that a source packet processor transmits with data packet fragments to crossbar processors in accordance with an embodiment of the present disclosure.

According to an embodiment, the source packet processors 110 transmit with each data packet fragment a header that contains various information used by crossbar processors 115 and/or target packet processors 130 to properly process the data packet fragments. The packet fragmentation unit 131 adds the header to each fragment, in an embodiment. FIG. 2 illustrates an example data packet fragment header 200 according to one embodiment. The header 200 is utilized by source packet processors to indicate when the crossbar processors should retransmit packet fragments, in an embodiment. Additionally, the header 200 provides information that is utilized by target packet processors to reassemble data packets from the fragments, in an embodiment.

The data packet fragment header 200 includes a traffic class (TC) field 202 that indicates a priority level associated with the traffic class (or a data flow) of the data packet. The TC field 202 is followed by a virtual local area network multicast group index (VIDX) field 204 which is used to indicate a distribution group for the fragment (e.g., the VIDX field indicates a set of one or more target packet processors). The VIDX field 204 is used by a crossbar device to identify one or more target packet processors to which a data packet fragment should be sent. A sequence field 206 indicates a sequence number assigned to the data packet by the source device at which the data packet had been received, and a fragment sequence field 208 indicates the sequence number of the packet fragment to which the header 200 corresponds. In an embodiment, the target processor utilizes the fragment sequence field 208 included with each packet fragment to reassemble the packet from the fragments. A last fragment field 210 is a flag which is set to identify the last fragment of a data packet. An enqueue approval (EA) field 212 is utilized to indicate to a crossbar processor when data fragments should be retransmitted to target processors, as will be discussed in more detail below. Thus, an EA field 212 that is set to a particular value may be utilized as the instructions 122 discussed above with respect to FIG. 1, in an embodiment. An enqueue approval override (EAO) field 214 and the byte count (BC) correction field 216 are also utilized to indicate to a crossbar processor when data fragments should be retransmitted to target processors, as will be discussed in more detail below. An identification (ID) field 218 identifies an enqueue cycle to which the fragment belongs. In an embodiment, an enqueue cycle is a period between when a previous instruction to retransmit fragments was transmitted to a crossbar processor and when a next instruction to retransmit fragments was transmitted to the crossbar processor. A source device field 220 identifies the source device (e.g., source packet processor) at which the data packet had been received. A control field 222 indicates a control (dummy) packet, which will be discussed in more detail below.

Figure 3A:
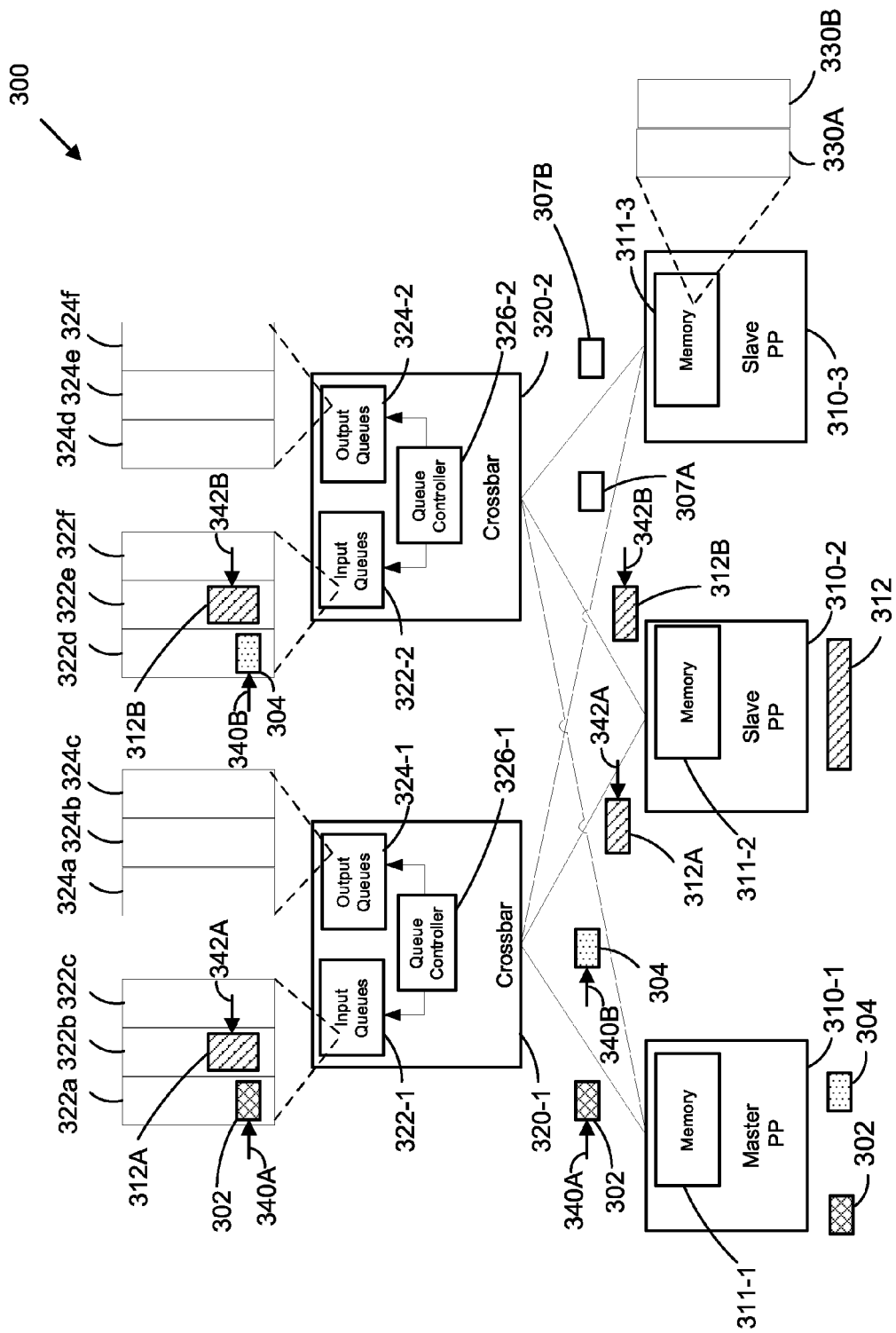
FIG. 3A-3C are block diagrams depicting an example modular switch implementing the network traffic directing techniques in accordance with an embodiment of the present disclosure.
Figure 3B:
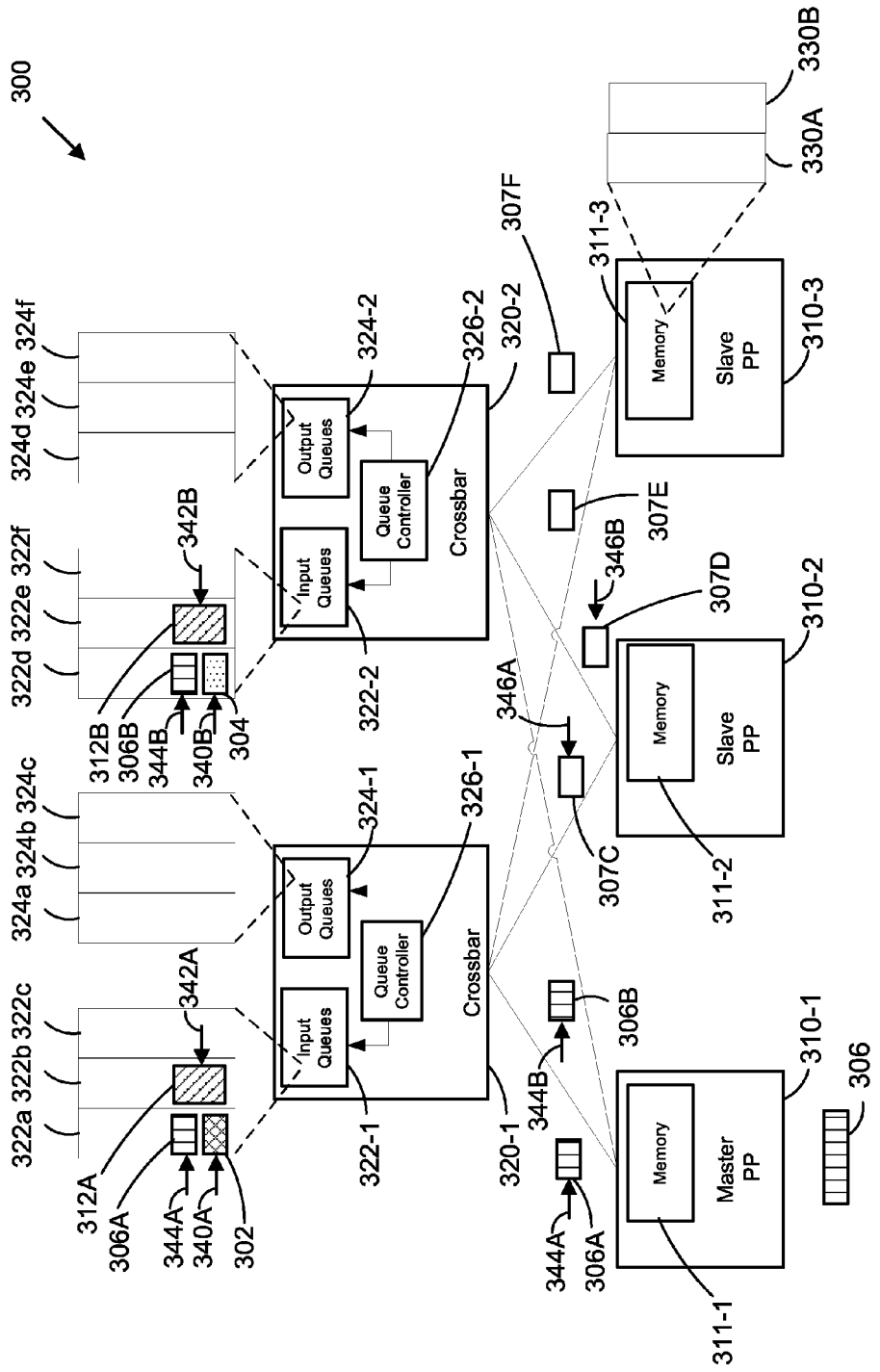
Figure 3C:
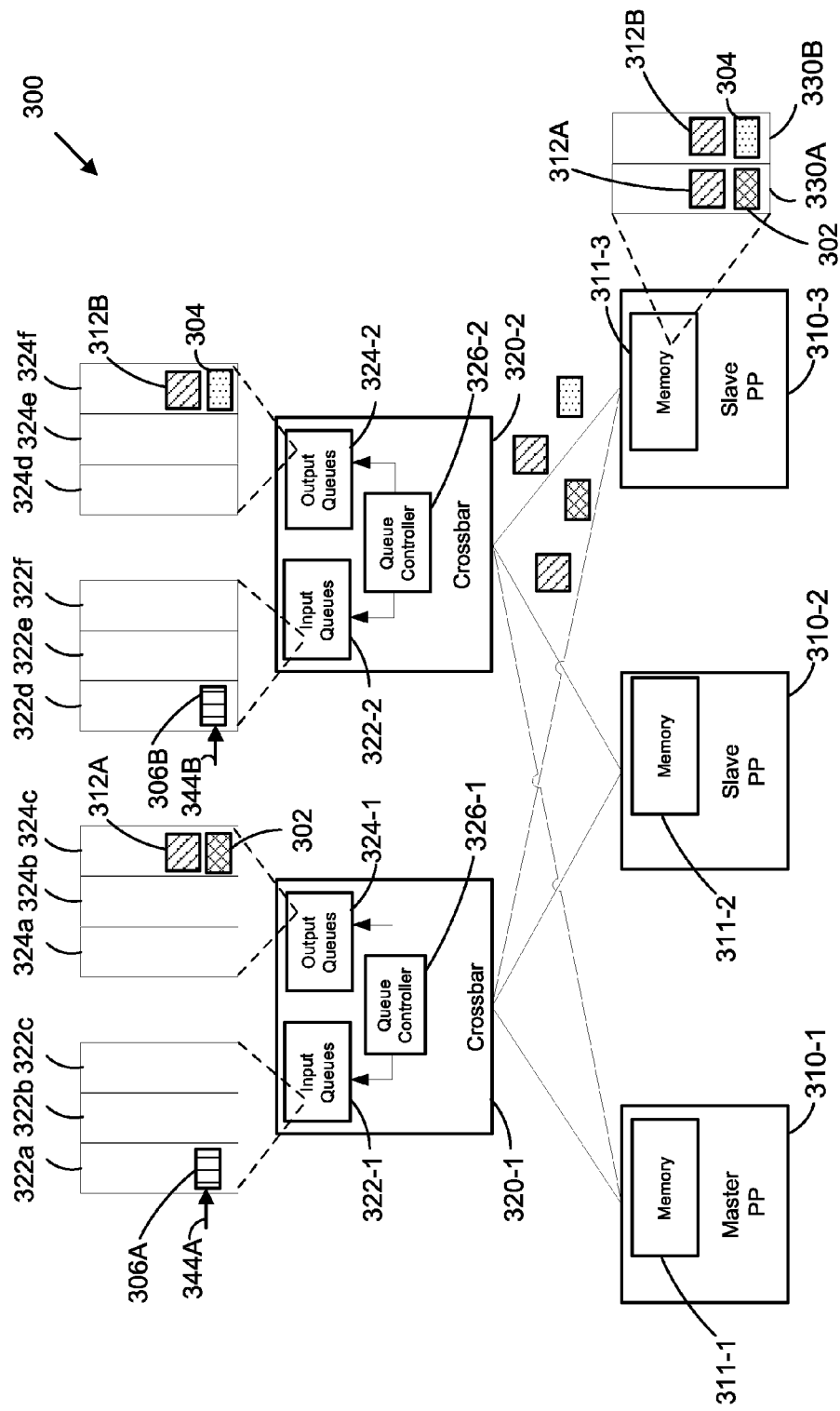

FIGS. 3A-3C are illustrations depicting transmission of several data packets through a modular switch 300 which includes a plurality of packet processors 310 interconnected by a plurality of crossbar processors 320, in accordance with an embodiment of the present disclosure. In an embodiment, each of the packet processors 310 is configured to both receive data packets from a network and transmit data packets to a network. For example, in an embodiment in which the modular switch 300 is disposed between a first network and a second network, a packet processor communicatively coupled to the first network is able to both receive data packets from the first network for transmission to the second network, and to transmit data packets received from the second network for transmission to the first network. Accordingly, each packet processor 310 can be, depending on the situation, a source packet processor that receives data packets from a network and a target packet processor that transmits data packets to a network. Referring to FIGS. 1 and 3A-3C, in an embodiment, the packet processors 310 (FIGS. 3A-3C) are generally configured as both the ingress (source) packet processors 110 (FIG. 1) and the egress (target) packet processors 130 (FIG. 1). In an embodiment, the crossbar processors 320 (FIGS. 3A-3C) are suitable for use as the crossbar processors 115 (FIG. 1). For ease of explanation, the modular switch 300 of FIGS. 3A-3C includes three packet processors 310 and two crossbar processors 320. In other embodiments, the modular switch 300 includes any other suitable number of packet processors 310 and any other suitable number of cross bar processors 320.

As illustrated in FIGS. 3A-3C, a source packet processor 310 receives a data packet from a network and forwards the received data packet, via one or more crossbar processors 320, to at least one target packet processor 310 for transmission of the data packet to another network, for example. Prior to forwarding a data packet, the source packet processor 310 determines whether the data packet should be transmitted to the target packet processor 310 as a plurality of fragments via multiple crossbar processors 320 or as a single "fragment" via one crossbar processor 320. For example, in one embodiment, a data packet is fragmented for transmission via multiple crossbar processors 320 if the size of the data packet exceeds a certain threshold ("packet fragmentation threshold"). As an illustrative example, in one embodiment, the packet fragmentation threshold is 64 bytes. Accordingly, in this embodiment, if the size of a data packet is 64 bytes or less, then the source packet processor 310 transmits the data packet to the target packet processor 310 as a single "fragment" via a single crossbar processor 330. Alternatively, in another embodiment, a packet fragmentation threshold is set as a minimum size for a single fragment. As an example, in one such embodiment, the minimum fragment size threshold is set to 64 bytes, and a data packer is transmitted as a single fragment if the size of the data packet is less than 128 bytes. Otherwise, if the size of a data packet is greater than 64 bytes (or 128 bytes, depending on the threshold being utilized), then the source packet processor 310 divides the data packet into a plurality of fragments for transmission to the target packet processor 310 via multiple crossbar processors 320, according to some embodiments. In other embodiments, the packet fragmentation threshold is a suitable value other than 64 bytes (or 128 bytes). In some embodiments, the packet fragmentation threshold is configurable by a user of the modular network switch 300 (e.g., a network engineer or administrator). Further, the number of fragments for dividing a data packet is configurable or selectable (for example, passed on the size of the data packet), and the packet fragments are sprayed to any suitable number of the cross bar processors 330 (e.g., to one, some, or all of the packet processors 330), in various embodiments and/or scenarios.

In an embodiment, each packet processor 310 includes the packet fragmentation unit 131 of FIG. 1. In an embodiment, the packet fragmentation unit 131 of each packet processor 310 is configured to fragment a data packet for transmission via multiple crossbar processors 320 if the size of the data packet exceeds the packet fragmentation threshold.

The crossbar processors 320 receive the packet fragments from the source packet processors 310 and store the received data packet fragments (e.g., in respective local memories of the respective crossbar processors 320), according to an embodiment. In order to cause the crossbar processors 320 to retransmit the stored data packet fragments to appropriate packet processors 310, in an embodiment, each packet processor 310 is configured to generate and send instructions that indicate to the crossbar processors 320 when fragments stored at the crossbar processors 320 are to be retransmitted to the appropriate target packet processors 310 for reassembly and transmission of each data packet to intended destination(s). As will be described in more detail below, such instructions are included in respective headers transmitted with packet fragments to the crossbar processors 320, in an embodiment. To this end, in an embodiment, each packet processor 310 includes the instruction generator unit 135 of FIG. 1 configured to generate such instructions and include such instructions in headers of packet fragments transmitted to the crossbar processors 320.

According to an embodiment, once a source packet processor 310 has sent a certain amount of data to the crossbar processors 320, i.e., once the amount of data sent by the source packet processor 310 to the crossbar processors 320 has reached a certain threshold ("jitter threshold"), the source packet processor initiates a cycle of transmitting instructions to the crossbar processors 320 to cause retransmission of data packet fragments from the crossbar processors 320 to target packet processors 310. In an embodiment, the jitter threshold value is selected to be greater than the amount of data that would be transmitted in an amount of time corresponding to a maximum difference in time of receiving data packet fragments from the same source packet processor at the different crossbar processors. In an embodiment, the jitter threshold is dependent on the difference of path lengths between the packet processors 310 and the crossbar processors 320.

In operation, once the jitter threshold has been reached by a source packet processor 310, the source packet processor 310 marks each of the following packet fragments sent to the crossbar processors 320 with an enqueue approval flag by transmitting a logic 1 in the EA field 212 (FIG. 2) of the header, for example. The cycle of sending such enqueue approvals continues until an enqueue approval has been sent in this manner to all of the crossbars 320. Further, in some situations, the source packet processor 310 marks a data packet fragment with an enqueue approval override (EAO field 214) if the source packet processor determines that the current fragment should be sent with an enqueue approval, but a previous fragment with an enqueue approval in the same enqueue approval cycle had been already sent to the same crossbar processor 320. In an embodiment, if a data packet fragment was sent with an enqueue approval override, as indicated by an EAO field of the header (e.g., field 214 of FIG. 2), then the queue controller 326 updates the previously saved location of the enqueue approval in the corresponding queue 322 with the location of the current data packet fragment.

Each crossbar processor 320 includes one or more input queues 322, one or more output queues 325, and a queue controller 326. The queue controller 326 processes the received packet fragments from each packet processor 310, stores the received data packet fragments in a memory, and stores a descriptor for each received data packet fragment in an input queue 322. Each descriptor indicates a location of the corresponding data packet fragment in the memory, in an embodiment. Each crossbar processor 320 is configured to generate packet fragment descriptors, in an embodiment.

Generally, each crossbar processor 320 maintains at least the same number of input queues as the number of packet processors 310 in the modular switch 300 (i.e., at least one input queue for each packet processor 310). Accordingly, in the depicted embodiment, each crossbar processor 320 maintains three input queues 322, and each input queue 322 at a particular crossbar processor 320 corresponds to a different packet processor 310. For example, referring to the crossbar processor 320-1, the input queue 322a stores data packet descriptors of data packet fragments that the crossbar processor 320-1 receives from the packet processor 310-1, input queue 322b stores data packet fragment descriptors of data packet fragments that the crossbar processor 320-1 receives from the packet processor 310-2, and the input queue 322c stores data packet fragment descriptors of data packet fragments that the crossbar processor 320-1 receives from the packet processor 310-3. Similarly, referring to the crossbar processor 320-2, the input queue 322d stores data packet descriptors of data packet fragments that the crossbar processor 320-2 receives from the packet processor 310-1, input queue 322e stores data packet fragment descriptors of data packet fragments that the crossbar processor 320-2 receives from the packet processor 310-2, and the input queue 322f stores data packet fragment descriptors of data packet fragments that the crossbar processor 320-2 receives from the packet processor 310-3.

In an embodiment, the queue controller 326 determines the identity of the source packet processor 310 (or of a source port of a packet processor 310) from which a data packet fragment was received based on a source device field (e.g., field 216 of FIG. 2) of a header of the data packet fragment, and then stores a descriptor corresponding to the data packet fragment accordingly. In an embodiment, the queue controller 326 determines an identity (or identities) of one or more target packet processors 310 to which a data packet fragment is to be retransmitted based on a field (e.g., the VIDX field 204 of FIG. 2) of the header of the data packet fragment.

Further, the queue controller 326 determines whether a data packet fragment was sent from a source port of a source packet processor 310 with an instruction that indicates to the crossbar processor 320 that at least some data packet fragments stored in the input queue 322 are to be transferred to the output queue 324 so that such data packet fragments can be retransmitted to appropriate target packet processor(s). In an embodiment, such an instruction is indicated using an enqueue approval field of the header (e.g., EA field 212 of FIG. 2) transmitted with the packet fragment, for example. If the queue controller 326 determines that a data packet was sent with an enqueue approval, then in addition to storing the data packet in an input queue 322, the queue controller 326 also stores the location of the data packet fragment in the queue. As will be described in more detail below, the location in the input queue 322 of the data packet fragment that includes the enqueue approval is subsequently utilized by the queue controller 326 to determine which data packet fragments in the input queue 322 are to be transferred to the output queue 324.

As explained in more detail below, to further synchronize the crossbar processors 320, one of the packet processors 310 is designated as a "master" packet processor, and the remaining packet processors 310 are designated as "slave" packet processors, according to an embodiment. In the embodiment illustrated in FIGS. 3A-3C, the packet processor 310-1 is the master packet processor and the packet processors 310-2 and 310-3 are slave packet processors. In an embodiment, the master packet processor 310-1 transmits data to crossbar processors 320 at a rate that is suitably lower than the rate of transmission of the "slave" packet processors 310-2 and 310-3. The master packet processor sets a limit to the amount of data that can be moved from an input queue corresponding to slave packet processor, according to an embodiment. Accordingly, in an embodiment, a crossbar processor 320 first determines the amount of data to be removed from an input queue corresponding to a master packet processor, and then only dequeues data from an input queue corresponding to a slave packet processor if the corresponding input queue contains a segment of fragments that can be dequeued without exceeding the amount of data in a segment that can be dequeued from the input queue corresponding to the master packet processor. A segment of fragments includes fragments received in an input queue during an enqueue cycle, in an embodiment.

In operation, according to an embodiment, the queue controllers 326 keep track of the amount of data (e.g., number of bytes) that the crossbar processors 320 receive from each packet processor 310 within an enqueue cycle. For example, in an embodiment, the queue controller 326 updates a respective counter (e.g., input queue byte counter) for each of the input queues 322 that keeps track of the amount of data received in an enqueue cycle from the corresponding packet processor 310. As explained in more detail below, in an embodiment, the crossbar processors 320 then base various decisions in regard to transmission of data packet fragments to target processors 310 at least in part on the amount of data received from the source packet processors 310. Accordingly, in order to synchronize data packet fragment transmission between the crossbar processor 320, when a source packet processor 320 sends different amounts of data to different packet processors 320, the source packet processor 310 includes "byte count corrections" in a header field of the transmitted fragment (e.g., field 216 of FIG. 2). In an embodiment, the queue controllers 326 of the crossbar processors 320 use the received byte count corrections to update the respective counters such that the counters register the same amount of received data even when the amount of received data is not the same. The byte count corrections are used to synchronize the crossbar processors 320 and ensure that different crossbar processors 320 simultaneously make the same decisions in regard to fragment transmission, according to an embodiment.

According to an embodiment, once a crossbar processor 320 has received at least two enqueue approvals from each of the packet processors 310, the queue controller 326 of the crossbar processor 320 determines the amount of data to be transferred from each of the input queues 322 to appropriate output queues 324. To this end, according to an embodiment, once a crossbar processor 320 receives two enqueue approvals for the master packet processor 310-1, the crossbar processor determines the number of bytes received from the master packet processor 310-1 (and stored in an input queue corresponding to the master packet processor 310-1) during the current enqueue cycle, up to the location of a first enqueue approval not overridden by a consequently received enqueue override (EOA). In an embodiment, the queue controller 326 then determines the amount of data that can be dequeued from each of the input queues corresponding to the slave packet processors 310 without exceeding the amount of data received during the enqueue cycle from master packet processor 310-1. In some embodiments, in addition to the input queue bytes counters described above, the queue controllers 326 maintain respective "deficit" counters, at least for each of the input queues corresponding to slave packet processors. In an embodiment, a deficit counter (e.g., a deficit counter for the input queue 322b) is used to keep track of the amount of data relative to the input queue corresponding to the master packet processor (input queue 322a) that remains in the corresponding input queue after the determined amount of data is removed (or dequeued) from the corresponding input queue (e.g., input queue 322b) to be moved to the appropriate output queue (or queues). Accordingly, in an embodiment, when the amount of data dequeued (or moved to one or more output queues) during an enqueue cycle from an input queue corresponding to a slave packet processor (e.g., 310-2, 310-3) is less than the amount dequeued during the same enqueue cycle from the input queue corresponding to the master packet processor 310-1, the queue controller 326 updates the deficit counter for the corresponding input queue to reflect the difference between the amount of data dequeued from the input queue corresponding to the master packet processor and the amount of data dequeued from the input queue corresponding to the salve packet processor. For example, in an embodiment, the queue controller 326-1 determines that the amount of data to be dequeued from an input queue 322 corresponding to the master packet processor 310-1 is 500 bytes (based on the input queue byte counter) and the deficit counter for the queue 322b is currently set to 100 bytes. If, in this embodiment, the queue controller 326-1 determines that the amount of data to be dequeued from the input queue 322b corresponding to the slave packet processor 310-2 is 400 bytes, then the queue controller 326-1 sets the deficit counter for the queue 322b to 200 bytes (500+100−400=200).

In some embodiments, in order to enable crossbar processors 320 to handle a number of errors (e.g., corrupted or missing packet fragments), the crossbar processors 320 are configured to receive more than two enqueue approval signals before transferring the descriptors (up to the location of the first enqueue approval) to the output queues and entering a new enqueue cycle. In some embodiments, to handle X number of errors at the crossbar processors 320, the crossbar processors 320 are configured to receive X+2 enqueue approval signals before moving corresponding descriptors to output queues. In such embodiments, if a crossbar processor 320 receives a corrupted fragment and is therefore unable to determine whether the fragment was sent with an enqueue approval indicated in the header, then, in some situations, the crossbar processor 320 determines the enqueue approval status of the corrupted packet fragment based on the ID field in the header of the next received data packet fragment. In particular, in an embodiment, if the ID field in the header of the next received data packet fragment carries a value that is different from the previously received fragment indicating that the previous enqueue cycle has finished, then the crossbar processor 320 determines that the corrupted packet fragment had indicated an enqueue approval and updates the enqueue approval count accordingly. In some embodiments, the missing or corrupted fragment error is then handled at the target packet processor 310, for example using a timeout technique described in more detail below. Further, in some embodiments, to reduce the amount of time needed at the target packet processor 310 to detect the error, the crossbar processor 320 transmits a control packet in place of the corrupted fragment to directly communicate to the target packet processor that the error has occurred.

In any event, once it has determined that a proper number of enqueue approvals from all packet processors 310 has been received, and the appropriate output queue or queues 324 for each data packet fragment descriptor has been determined based on information provided in the header of the data packet fragment (e.g., VIDX field 204 of FIG. 2), the queue controller 326 then transfers the one or more descriptors that correspond to the data packet fragments of the completed enqueue cycle from the input queues 322 to the output queues 324. Upon dequeueing the descriptors, the queue controller 326 enters a new enqueue cycle and updates the input queue byte counters and the deficit counters as described above. Further, according to an embodiment, if the VIDX field 204 of a certain data packet fragment header indicates that the data packet fragment should be sent to several target packet processors 310, i.e., if the data packet fragment belongs to a multicast data packet, then the queue controller 326 copies the corresponding descriptor to the output queues 324 that correspond to the additional target packet processors 310 indicated in the VIDX field 204. Further, in some embodiments, the modular switch 300 is configured to handle several priority levels. In such embodiments, a traffic class field of the header (e.g., field 202 of FIG. 2) is used to determine a priority level corresponding to the data packet fragment. The queue controller 326 then determines the appropriate output queue for a data packet fragment based on the priority level indicated in the TC field of the header in addition to the VIDX field of the header, for example.

According to an embodiment, to preserve packet fragment order, the queue controller 326 of each crossbar processor 320 moves the descriptors from input to output queues in a particular predetermined order. For example, in an embodiment, each queue controller 326 first moves all fragment descriptors corresponding to the packet fragments determined to be dequeued in the current enqueue cycle from the input queue 322 corresponding to the packet processor 310-1 (322a, 322d), then moves all fragment descriptors corresponding to the packet fragments determined to be dequeued in the current enqueue cycle from the input queue 322 corresponding to the packet processor 310-2 (322b, 322e), and so on. In some embodiments, prior to moving descriptors from a queue 322 corresponding to a slave packet processor 310, a queue controller 326 checks if the same or greater amount of data has been received by the crossbar processor from the master packet processor 310 and then moves the descriptors out of the input queue 322 to the output queue 324. For example, if the queue controller 326-1 determines that the amount of data received by the crossbar processor 320-1 from the master packet processor 310-1 during the enqueue cycle exceeds the amount of data that the crossbar processor 320-1 received from the slave packet processor 310-2 during the enqueue cycle, then the queue controller 326-1 moves the corresponding descriptors from the input queue 322b to the appropriate output queues 324 and enters a new enqueue cycle. On the other hand, if the queue controller 326-1 determines that the amount of data received by the crossbar processor 320-1 from the master packet processor 310-1 during the enqueue cycle is less than the amount of data that the crossbar processor 320-1 received from the slave packet processor 310-2 during the enqueue cycle, then no data is dequeued by the queue controller until a sufficient amount of data is enqueued during the current enqueue cycle. Accordingly, in this case, the queue controller 326-1 does not yet enter a new queue cycle, in an embodiment. In an embodiment, once fragments up to and including the appropriate EA location in each queue have been moved to appropriate output queues, the crossbar processor 320 transmits the contents of output queues to the appropriate target packet processors 310.

Each packet processor 310 includes a memory 311 and each packet processor 310 maintains a buffer 330 in the memory 311 for storing packet fragments retransmitted by the crossbar processors 320. For example, the packet processor 310-3 includes a memory 311-3 with buffers 330A and 33B. The buffer 330A corresponds to data packet fragments retransmitted by the crossbar processor 320-1, whereas the buffer 330B corresponds to data packet fragments retransmitted by the crossbar processor 320-2.

In an embodiment, each packet processor 310 includes a packet reassembly unit 140 (FIG. 1). The packet reassembly unit 140 reassembles packet fragments stored in the buffers 330. Once a data packet has been reassembled, the packet processor 310 transmits the reassembled data packet via one or more network links.

As discussed above, prior to forwarding a data packet, the source packet processor 310 (e.g., the packet fragmentation unit 131) determines whether the data packet 302 should be transmitted to the target packet processor 310 as a plurality of fragments via multiple crossbar processors 320 or as a single "fragment" via one crossbar processor 320. In some embodiments, data packets that exceed the packet fragmentation threshold are fragmented into a number of fragments that is equal to the number of crossbar processors 320 in the modular network switch 300 for distribution of the data packet to all crossbar processors 320. In one such embodiment, with the fragmentation size threshold set to 64 bytes, the input packet processor 310-1 divides the data packet into a number F fragments in accordance with:

$$F = \text{INT}\left(\text{MIN}\left(\frac{\text{packet size}}{64}, \text{ number of crossbars}\right)\right) \quad \text{Equation 1}$$

where $\text{INT}(x)$ is the closest integer less than or equal to x, and $\text{MIN}(a,b)$ is the minimum of a and b. In this embodiment, the size of each fragment is then given by:

$$\text{Fragment Size} = \text{INT}\left(\frac{\text{packet size}}{F}\right) \pm 1 \quad \text{Equation 2}$$

However, in general, the number of packet fragments need not equal the number of crossbar processors, and the input processor 310-1 divides a data packet into any other suitable number of fragments in other embodiments.

FIG. 3A depicts the packet processor 310-1 receiving data packets 302, 304 (e.g., from a network) and the packet processor 310-2 receiving the data packet 312 (e.g., from a network). The size of each of the data packet 302 and the data packet 304 does not exceed the packet fragmentation threshold, and thus the packet processor 310-1 transmits each of the data packets 302 and 304 as a single fragment to a single crossbar processor 320. In particular, the packet processor 310-1 transmits the data packet 302 as a single fragment to the crossbar 320-1 and the data packet 304 as a single fragment to the crossbar processor 320-2. The crossbar processor 320-1 stores the data packet fragment 302 in an input queue 322-1, and the crossbar processor 320-2 stores the data packet fragment 304 in an input queue 322-2. In particular, the crossbar processor 320-1 stores the data packet fragment 302 in an input queue 322a corresponding to the packet processor 310-1, and the crossbar processor 320-2 stores the data packet fragment 304 in an input queue 322d corresponding to the packet processor 310-1. In an embodiment, "storing a data packet fragment in an input queue" refers to storing a descriptor associated with the data packet fragment in the input queue, whereas the actual data packet fragment is stored in a memory segment of the crossbar processor separate from the input queue. However, in other embodiments, entire data packet fragments are stored in the input queue, in which case descriptors for the fragments need not be generated. For example, the descriptor includes fields from a header of the fragment as well as a pointer to (or another suitable indication of a location in the memory segment of) the data packet fragment in the memory segment separate from the input queue.

The size of the data packet 312, on the other hand, is greater than the threshold value and, accordingly, the data packet 312 is divided into two fragments at the packet processor 310-2 and each fragment 312A and 312B is then transmitted to a respective crossbar processor 320. The crossbar processor 320-1 stores the data packet fragment 312A in the input queue 322-1, and the crossbar processor 320-2 stores the data packet fragment 312B in the input queue 322-2. In particular, the crossbar processor 320-1 stores the data packet fragment 312A in an input queue 322b corresponding to the packet processor 310-2, and the crossbar processor 320-2 stores the data packet fragment 312B in an input queue 322e corresponding to the packet processor 310-2, in an embodiment.

In an embodiment, to ensure synchronized operation of the crossbar processors 320, data packet fragments are generally transmitted simultaneously from all packet processors 310. In such an embodiment, if a particular packet processor 310 does not have data to transmit to the cross bar processors 320, then the packet processor 310 transmits a control (or a dummy) packet to each of the crossbar processors 320. Additionally or alternatively, in such an embodiment, if a particular packet processor 310 does not have enough data packet fragments to transmit to all of the crossbar processors 320, then the packet processor 310 transmits one or more control (or dummy) packets 307 to each of the remaining crossbar processors 320 (i.e., crossbar processors 320 for which the packet processor 310 does not have an actual packet fragment to send). In the embodiment of FIG. 3A, because the packet processor 310-3 has not received any data packets from a network, the packet processor 310-3 transmits dummy packets 307A and 307B to the crossbar processors 320-1 and 320-2, respectively.

In some embodiments, each of the fragments 302, 304, 312A, 312B, and 307 includes a header, such as the header 200 of FIG. 2 or another suitable header. The headers are used by the crossbar processors 220 to synchronize transmission of data packet fragments with other crossbar processors. In an embodiment, after processing a header of a control (dummy) packet and thereby extracting necessary information provided in the header, a crossbar processor 220 then discards the dummy packet. In other words, in this embodiment, the dummy packet need not be further routed in the modular switch 300 and/or not be stored in an input queue 322. According to an embodiment, packet fragments are identified by crossbar processors as dummy packets by a value of the control field of the packet (e.g., field 222 of FIG. 2).

FIG. 3B depicts the modular switch 300 at a subsequent time. In the illustration of FIG. 3B, the packet processor 310-1 receives a data packet 306 (e.g., from a network). The size of the data packet 306 is greater than the threshold value and, accordingly, the data packet 306 is divided into two fragments at the packet processor 310-1, and each fragment 306A and 306B is then transmitted to a respective crossbar processor 320. The crossbar processor 320-1 stores the data packet fragment 306A in the input queue 322-1, and the crossbar processor 320-2 stores the data packet fragment 306B in the input queue 322-2. In particular, the crossbar processor 320-1 stores the data packet fragment 306A in the input queue 322a, and the crossbar processor 320-2 stores the data packet fragment 306B in an input queue 322d.

In the embodiment of FIG. 3B, because the packet processor 310-2 does not have any data packet fragments to transmit to the crossbar processors 320, the packet processor 310-2 transmits dummy packets 307C and 307D, respectively, to the crossbar processors 320-1 and 320-2. Similarly, because the packet processor 310-3 does not have any data packet fragments to transmit to the crossbar processors 320, the packet processor 310-3 transmits dummy packets 307E and 307F, respectively, to the crossbar processors 320-1 and 320-2.

Referring again to FIG. 3A, the packet processor 310-1 set the EA field of the packet fragment 302 to logic 1, as signified by the arrow 340A, and set the EA field of the packet fragment 304 to logic 1, as signified by the arrow 340B. Similarly, the packet processor 310-2 set the EA field of the packet fragment 312A to logic 1, as signified by the arrow 342A, and set the EA field of the packet fragment 312B to logic 1, as signified by the arrow 342B.

Referring again to FIG. 3B, because the jitter threshold was reached by transmitting the fragments 302, 304 (in FIG. 3A), the packet processor 310-1 set the EA field of the packet fragment 306A to logic 1, as signified by the arrow 344A, and set the EA field of the packet fragment 306B to logic 1, as signified by the arrow 344B. Similarly, because the jitter threshold was reached by transmitting the fragments 312A, 312B, the packet processor 310-2 set the EA field of the dummy fragment 307C to logic 1, as signified by the arrow 346A, and set the EA field of the dummy fragment 307D to logic 1, as signified by the arrow 346B, according to an embodiment.

In response to receiving the packet fragment 306 with the EA field 344A in the header transmitted with the packet fragment 306 set to logic 1, the crossbar processor 320-1 transfers to output queues 324-1 everything in the input queue 322a from the head of the queue up to and including the packet fragment with the previous occurrence of the EA field set to logic 1. In the example of FIGS. 3B and 3C, the crossbar processor 320-1 transfers the packet fragment 302 from the input queue 322a to the output queue 324b, which corresponds to the target packet processor 310-3 for the packet fragment 302. In an embodiment, the queue controller 326-1 determines that the packet fragment 302 belongs to a segment that can be transmitted in the current enqueue cycle, and transfers the packet fragment 302 in response to the EA field 344A set to logic 1.

Similarly, in response to receiving a packet fragment having a header with the EA field 344B set to logic 1, the crossbar processor 320-2 transfers to output queues 324-2 everything in the input queue 322d from the head of the queue up to and including the packet fragment with the previous occurrence of the EA field set to logic 1, according to an embodiment In the example of FIGS. 3B and 3C, the crossbar processor 320-2 transfers the packet fragment 304 from the input queue 322d to the output queue 324f, which corresponds to the target packet processor 310-3 for the packet fragment 304. In an embodiment, the queue controller 326-2 determines that the packet fragment 304 belongs to a segment that can be transmitted in the current enqueue cycle, and transfers the packet fragment 304 in response to the EA field 344B set to logic 1.

Similarly, in response to receiving a packet fragment having a header with the EA field 346A set to logic 1, the crossbar processor 320-1 transfers to output queues 324-1 everything in the input queue 322b from the head of the queue up to and including the packet fragment with the previous occurrence of the EA field set to logic 1. In the example of FIGS. 3B and 3C, the crossbar processor 320-1 transfers the packet fragment 312A from the input queue 322b to the output queue 324b, which corresponds to the target packet processor 310-3 for the packet fragment 312A. In an embodiment, the queue controller 326-1 determines that the packet fragment 312A belongs to a segment that can be transmitted in the current enqueue cycle, and transfers the packet fragment 312A in response to the EA field 346A set to logic 1.

Similarly, in response to receiving a packet fragment having a header with the EA field 346B set to logic 1, the crossbar processor 320-2 transfers to output queues 324-2 everything in the input queue 322e from the head of the queue up to and including the packet fragment with the previous occurrence of the EA field set to logic 1. In the example of FIGS. 3B and 3C, the crossbar processor 320-2 transfers the packet fragment 312B from the input queue 322e to the output queue 324f, which corresponds to the target packet processor 310-3 for the packet fragment 312B. In an embodiment, the queue controller 326-2 determines that the packet fragment 312B belongs to a segment that can be transmitted in the current enqueue cycle, and transfers the packet fragment 312B in response to the EA field 346B set to logic 1.

The packet fragments in the output queues 324 are retransmitted to appropriate packet processors 310. For example, the packet data fragments 302, 204, 312A and 312B are retransmitted to the packet processor 310-3. The order of the data packet fragments received at the target packet processor 310-3 is illustrated in the reassembly buffer 330. First, the data packet 310-3 receives the data packet fragment 302 and the data packet fragment 304. Then, the data packet fragments 312A and 312B are received. As shown, the data packet fragments arrive in the correct order such that the packet processor 310-3 is able to reassemble the data packets from the data packet fragments without having to reorder the received fragments. The packet processor 310 identifies which of the received fragments belong to a particular data packet, and the order of the fragments within the particular data packet based on the source device field 220, the ID field 218 and the fragment sequence field 208 of the header of the fragment, in an embodiment. That is, data packet fragments indicating the same source device 220 and the same ID 218 in the respective header fields are determined to belong to the same data packet, and the data packet is then assembled from the data packet fragments according to the respective fragment sequence field 208 of the header, in an embodiment.

It is noted that by receiving data packet fragments in the correct order is that a sufficient size of a reassembly buffer at the target packet processor 310-3 is based on the size of the largest packet that can travel through the modular switch 300. For example, in one embodiment, the sufficient size of the reassembly buffer is a "jumbo frame", or the largest frame that the modular switch 300 is configured to rout plus a certain amount of overshoot. That is, in an embodiment, the size of the reassembly buffer is given by:

$$\text{Buffer size} = \text{MAX}\left(\left\lceil \frac{\text{number of crossbars} \times 64}{\text{jumbo packet size}} \right\rceil \times \text{jumbo packet size, jitter threshold} + \text{overshoot}\right) \quad \text{Equation 3}$$

Further, in this case, the size of the reassembly buffer remains the same as the number of crossbar processors in the modular switch 300 increases (and thus as the bandwidth capacity that the modular switch 300 can handle increases). That is, in that case, the number of data packet fragments corresponding to a data packet increases, but the size of each data packet fragment decreases and, accordingly, the sufficient size of the reassembly buffer remains the same.

In some embodiments in which the modular switch 300 is configured to handle several priority levels, the target packet processors 310 include a separate reassembly buffer for each of several priority levels. In such embodiments, In general, in an embodiment, data packet reassembly at the target packet processor 310 can begin once a certain amount of data has been received from the crossbar processors. Receiving at least the amount of data that equals the threshold prior to beginning reassembly of a data packet at a target packet processor 310 ensures that all fragments of the data packet have been received prior to reassembly. In other words, in this case, reassembly of a data packet begins at a target processor 310 only after all fragments of the data packet have arrived to the target packet processor 310. Further, in the embodiment, the target processor 310 employs a "timeout" to detect and discard data packets in which at least one data packet fragment is not received by the target packet processor 310 (lost fragment). That is, if all data packet fragments have not been received from all crossbar processors 320 within a certain period of time, then the target packet processor 310 determines that a packet fragment has been lost and discards the remaining fragments of the data packet.

Figure 4:
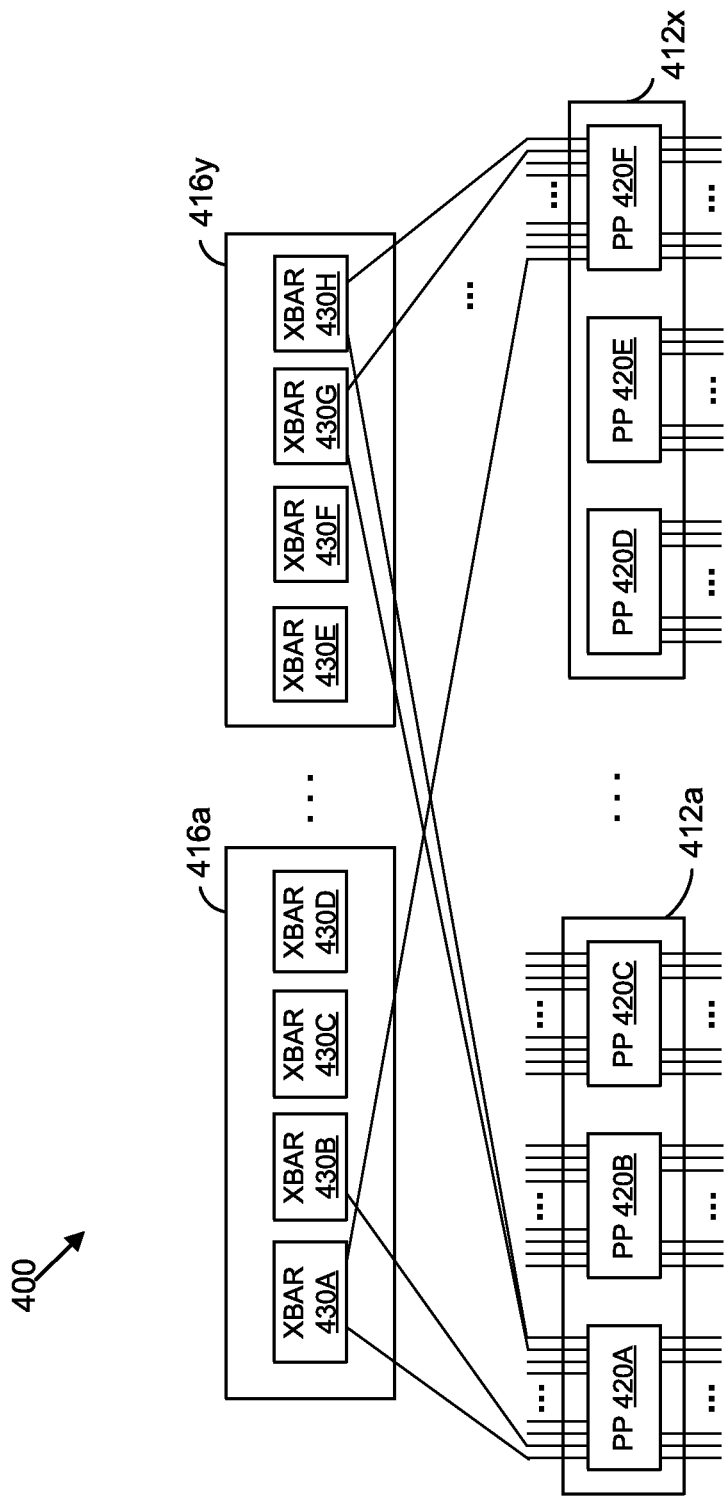
FIG. 4 is a diagram of a modular switching device configuration in accordance with an embodiment of the present disclosure.

FIG. 4 is a diagram of a modular switch configuration 400 implementing enqueue techniques of the present disclosure, according to an embodiment. The modular switch configuration 400 is suitable for use as the modular switch 100 of FIG. 1 and/or the modular switch 300 of FIG. 3. The modular switch configuration 400 comprises a plurality of line cards 412 and a plurality of fabric cards 416. Each line card 412 includes a plurality of packet processors 420 and each fabric card 416 includes a plurality of crossbar processors 430 that provide interconnectivity between the packet processors 420 in the line cards 412. As an example, in one embodiment, the packet processors 420 include the ingress packet processors 110 and the packet processors of FIG. 1 and the crossbar processors 430 include the crossbar processors 115 of FIG. 1. Similarly, in another embodiment, the packet processors 420 include the packet processors 310 of FIG. 3 and the crossbar processors 430 include the crossbar processors 320 of FIG. 3. In some embodiments, the line cards 412 and the fabric cards 416 are mounted in a chassis. In one such embodiment, in accordance to FIG. 4, the modular switch 400 comprises a chassis switching system with the total of M packet processors and N crossbar processors mounted in a chassis. In some embodiment, the number of packet processors M equals the number of crossbar processors N, while in other embodiments the number of packet processors M is different from the number of crossbar processors N. Further, in some embodiments, the crossbar processors 420 and the crossbar processors 430 are not arranged on different line cards and fabric cards, respectively, and/or are mounted in a chassis, but are arranged in the modular switching device 400 in a different manner, for example on a single card of the modular switch 400.

In other embodiments, the modular switch 100 of FIG. 1 and/or the modular switch 300 of FIG. 3 utilize a suitable configuration different than the configuration illustrated in FIG. 4.

Figure 5:
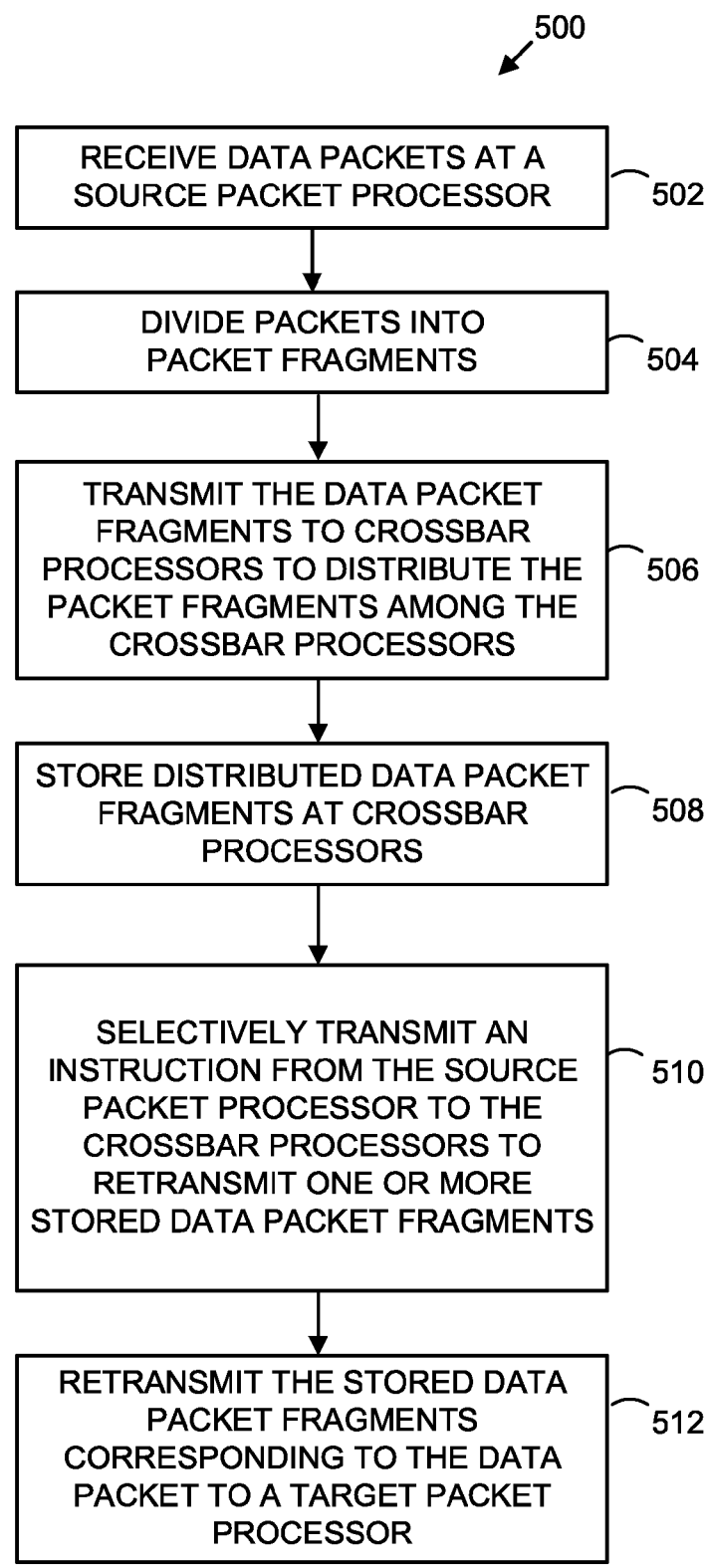
FIG. 5 is a flow diagram of an example method for routing network traffic using the network traffic routing techniques in accordance with an embodiment of the present disclosure.

FIG. 5 is a flow diagram of an example method 500 for directing network traffic through a modular switch device, according to an embodiment. In various embodiments, the method 500 is implemented by the modular switch 100 of FIG. 1, the modular switch 300 of FIG. 3, the modular switch 400 of FIG. 4, or another suitable modular switching device. The method 500 will be discussed with reference to FIGS. 1 and 3 for ease of illustration.

At block 502, a source packet processor receives data packets from a network. For example, each ingress packet processor 110 (FIG. 1) receives data packets from one or more networks. Similarly, as another example, each packet processor 310 (FIG. 3) receives data packets from one or more networks. The received data packets include a first data packet.

At block 504, the source packet processor divides data packets received at block 502 into one or more fragments, when appropriate, for transmission to one or multiple crossbar processors. When a data packet is not divided into multiple fragments prior to transmitting the data packet to a crossbar processor, the present disclosure refers to the transmitted data packet as a data packet fragment. In an embodiment, the source packet processor determines the number of fragments into which a particular data packet received at block 502 is to be divided by comparing the size of the data packet to a threshold. In one embodiment, the source packet processor transmits a whole data packet as a single data packet fragment to one crossbar processor if the size of the data packet does not exceed the threshold. On the other hand, if the size of the data packet exceeds the threshold, then the source packet processor divides the data packet into a plurality of data packet fragments. In one embodiment, in this case, the source packet processor divides the data packet into a number of data packet fragments determined by the number of crossbar processors included in the modular switching device in which the method 500 is being implemented. In one embodiment, the source packet processor divides the data packets into data packet fragments in accordance with Equation 1.

As discussed above, the packet fragmentation unit 131 (FIG. 1) divides packets received by the source packet processor 110 into multiple fragments, when appropriate. Similarly, each packet processor 310 (FIG. 3) is configured to divide packets received by the packet processor 310 into multiple fragments, when appropriate.

At block 506, the source packet processor transmits the one or more data packet fragments to a corresponding plurality of crossbar processors. At least one of the transmitted data packet fragment(s) corresponds to the first data packet. At block 508, the data packet fragments transmitted at block 506 are stored at the respective crossbar processors. For instance, in one embodiment, data packet fragments are stored in a memory of the crossbar processor, and descriptors corresponding to the data packet fragments are stored in input queues of the crossbar processors, as discussed above.

At block 510, the source packet processor selectively transmits an instruction to the crossbar processors indicating that stored data packet fragment(s) corresponding to the first data packet should be retransmitted to at least one target packet processor. In an embodiment, block 510 includes selectively transmitting an instruction to the crossbar processors indicating that a subset of data packet fragments stored at the crossbar processors (including the data packet fragment(s) corresponding to the first packet) should be retransmitted to one or more target packet processors. In an embodiment, selectively transmitting the instruction comprises transmitting the instruction after at least a certain amount of data has been sent from the source device to the crossbar processors during a period that includes transmission of the data packet fragment(s) corresponding to the first data packet. In one embodiment, to ensure that the data packet fragment(s) corresponding to the first data packet have been received by the crossbar processors prior to selectively transmitting the instruction at block 510, the instruction is transmitted at block 510 only if the amount of data sent from the source packet processor to the crossbar processors exceeds a jitter threshold during a period that includes transmission of the data packet fragment(s) corresponding to the first data packet. In an embodiment, the value of the jitter threshold is selected based on factors related to a particular configuration (e.g., trace length) of the modular switch in which the method 500 is being implemented. In an embodiment, the instruction transmitted at block 510 is included in a header of one or more data packet fragments corresponding to a second data packet that was received by the source packet processor.

At block 512, in response to receiving the instruction, the crossbar processors retransmit the data packet fragment(s) to at least one target packet processor. In some embodiments, if the first data packet is a data packet that should be transmitted to multiple target packet processors (i.e., a multicast data packet) then the data packet fragments are transmitted at block 512 to multiple packet processors. In an embodiment, because data packets are stored at the crossbar processors at block 508 and are retransmitted to the one or more target packet processors at block 512 in response to the instruction transmitted from the source packet processor at block 510, the data packet fragments corresponding to the first data packet arrive to the one or more target packet processors in order, without any other data packet fragments in between the fragments of the first data packet. Accordingly, in such embodiments, the data packet fragments corresponding to the first data packet can be reassembled at the target packet processors without a need to reorder the received data packet fragments at the target packet processors.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored on any non-transitory computer readable medium such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or transmitted via a communication network. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for routing network traffic, the method comprising:
   receiving data packets at a source packet processor that is disposed in a modular switching device having a plurality of packet processors and a plurality of crossbar processors coupled to the plurality of packet processors;
   dividing, at the source packet processor, each of at least some of the received data packets into a plurality of data packet fragments;
   transmitting the data packet fragments to the crossbar processors to distribute the packet fragments among the crossbar processors;
   storing distributed data packet fragments at respective crossbar processors;
   selectively transmitting from the source packet processor to the crossbar processors an instruction to retransmit first stored packet fragments corresponding to a first data packet that had been received at the source packet processor;
   transmitting, based on the instruction received from the source packet processor, the first stored packet fragments from the crossbar processors to a target packet processor among the plurality of packet processors;

receiving, at the target packet processor, the data packet fragments from the crossbar processors; and reassembling, at the target packet processor, the data packet from the received data packet fragments to produce a reassembled data packet.

2. A method according to claim 1, wherein selectively transmitting the instruction to the crossbar processors comprises including the instruction in one or more data packet fragments corresponding to at least a second data packet that had been received by the source packet processor.

3. A method according to claim 2, further comprising:
at a crossbar processor of the plurality of crossbar processors:
storing a descriptor corresponding to the data packet fragment received by the crossbar processor in an input queue; and
in response to receiving the instruction, moving the descriptor to an output queue.

4. A method according to claim 3, wherein moving the descriptor to the output queue comprises moving the descriptor to an output queue associated with the target packet processor.

5. A method according to claim 3, wherein moving the descriptor to the output queue comprises moving the descriptor to an output queue associated with i) the target packet processor and ii) a traffic class associated with the data packet fragment.

6. A method according to claim 3, further comprising:
replicating the descriptor in one or more additional output queues, wherein each of the one or more additional output queues is associated with a respective additional target packet processor; and
in response to receiving the instruction, transmitting, from the crossbar processor, the first data packet fragment to each respective additional target packet processor.

7. A method according to claim 1, wherein selectively transmitting the instruction comprises transmitting the instruction after an amount of data transmitted to the crossbar processors has reached a threshold value.

8. A method according to claim 1, wherein selectively transmitting the instruction comprises transmitting a first instruction and a second instruction, and wherein transmitting the first stored packet fragments comprises transmitting the first stored packet fragments in response to receiving the second instruction.

9. A method according to claim 1, further comprising:
transmitting, with the target packet processor, the reassembled data packet to a network.

10. A method according to claim 9, wherein reassembling the data packet comprises storing the received data packet fragments in a reassembly buffer, wherein a sufficient size of a reassembly buffer at the target packet processor is based on a size of the data packet and on a number of crossbar processors in the plurality of crossbar processors.

11. A method according to claim 1, wherein the target packet processor processes the received data packet fragments in different queues associated with different priority levels.

12. A modular switch device, comprising:
a plurality of ingress packet processors configured to receive data packets from a network, divide selected data packets into data packet fragments, transmit the data packet fragments for additional processing in the modular switch device, and selectively generate and transmit control instructions governing an additional processing operation to be performed on the data packet fragments;
a plurality of crossbar processors coupled to the plurality of ingress packet processors, the crossbar processors configured to receive data packet fragments from the plurality of packet processors, store the received data packet fragments in respective memories of the crossbar processors, receive from a first ingress packet processor a first control instruction governing the additional processing operation to be performed on one or more stored data packet fragments and in response to the first control instruction retransmit one or more stored data packet fragments; and
a plurality of egress packet processors coupled to the plurality of crossbar processors, the egress processors configured to receive the one or more data packet fragments that are retransmitted from the plurality of crossbar processors, reassemble the data packets from the retransmitted one or more data packet fragments; and perform a packet processing operation to egress the reassembled data packets.

13. The modular switch device of claim 12, wherein the additional processing operation includes one or more of i) storing the data packet fragments in memories of the crossbar processors and ii) retransmitting the stored data packet fragments from the crossbar processors to the egress processors.

14. The modular switch device of claim 12, wherein the additional processing operation further comprises storing descriptors corresponding to the data packet fragments in input queues at the crossbar processors.

15. The modular switch device of claim 14, wherein retransmitting one or more stored data packet fragments in response to the first control instruction comprises moving the one or more data packet fragments from the input queue to output queues corresponding to one or more egress packet processors to which the one or more data packet fragments are to be retransmitted.

16. The modular switch of claim 15, wherein the one or more output queues are further associated with priority levels corresponding to the data packet fragments.

\* \* \* \* \*